(12) United States Patent
Lentz (10) Patent No.: US 10,183,340 B2
(45) Date of Patent: Jan. 22, 2019

(54) TWIST LOCK TOOL SYSTEM

(71) Applicant: The Boeing Company, Chicago, IL (US)

(72) Inventor: Trevor C. Lentz, Graham, WA (US)

(73) Assignee: The Boeing Company, Chicago, IL (US)

( * ) Notice: Subject to any disclaimer, the term of this patent is extended or adjusted under 35 U.S.C. 154(b) by 1085 days.

(21) Appl. No.: 14/317,547

(22) Filed: Jun. 27, 2014

(65) Prior Publication Data

US 2015/0375307 A1 Dec. 31, 2015

(51) Int. Cl.
*B23B 31/11* (2006.01)
*B23B 49/02* (2006.01)
*B23B 31/113* (2006.01)

(52) U.S. Cl.
CPC .......... *B23B 49/023* (2013.01); *B23B 31/113* (2013.01); *B23B 2240/04* (2013.01); *Y10T 29/49897* (2015.01); *Y10T 29/49899* (2015.01); *Y10T 279/17863* (2015.01); *Y10T 279/17888* (2015.01); *Y10T 403/7007* (2015.01)

(58) Field of Classification Search
CPC ............. B23B 49/023; B23B 2240/04; B23B 2240/00; B23B 31/113; Y10T 279/17888; Y10T 279/17863; Y10T 403/7007; Y10T 29/49897; Y10T 29/49899
USPC ............................... 29/465, 466; 279/89–94
See application file for complete search history.

(56) References Cited

U.S. PATENT DOCUMENTS

| | | | | |
|---|---|---|---|---|
| 1,748,006 A * | 2/1930 | Wohlart | ................ | B23B 49/023 408/241 R |
| 2,558,814 A | 7/1951 | Briney | | |
| 3,336,822 A * | 8/1967 | Armacost | ............. | B23B 49/023 408/241 R |
| 3,591,307 A * | 7/1971 | Barnard | ................ | B23B 49/023 408/201 |
| 3,756,736 A * | 9/1973 | Marcoux | ................ | B23B 49/023 408/14 |
| 4,507,026 A * | 3/1985 | Lund | ...................... | B23B 49/008 408/14 |
| 4,615,651 A * | 10/1986 | Vinceller | ................ | B23G 1/265 408/200 |
| 4,740,117 A * | 4/1988 | Schaff Deleury | ....... | B23B 49/02 408/115 B |
| 5,046,857 A * | 9/1991 | Metzger | ................... | G01K 7/16 338/22 R |
| 5,342,126 A * | 8/1994 | Heston | ...................... | G01K 1/14 24/DIG. 53 |
| 5,664,913 A * | 9/1997 | Scholz | .................... | B23B 49/02 408/115 B |
| 5,730,560 A * | 3/1998 | Marcelloni | ........... | B23B 49/023 408/115 B |
| 6,971,824 B2 * | 12/2005 | Blankenship | ........... | B23B 47/28 408/3 |

(Continued)

*Primary Examiner* — Bayan Salone
(74) *Attorney, Agent, or Firm* — Perman & Green, LLP (57) ABSTRACT

A tool system including a liner having a body and a plurality of coupling members extending from the body, the body includes a first aperture through which at least part of a tool extends and is configured for coupling to a tool fixture, and a housing having an second aperture through which the at least part of the tool extends, a first end of the housing having grooves configured to mate with the plurality of coupling members to couple the tool within the grooves and to the tool fixture.

20 Claims, 8 Drawing Sheets

(56) References Cited

U.S. PATENT DOCUMENTS

| | | | | |
|---|---|---|---|---|
| 7,901,165 B2* | 3/2011 | Lipczynski | ........... | B23B 49/023 |
| | | | | 408/1 R |
| 7,914,242 B2* | 3/2011 | Lipczynski | ........... | B23B 49/023 |
| | | | | 408/115 R |
| 8,057,137 B2* | 11/2011 | Lipczynski | ........... | B23B 49/023 |
| | | | | 408/87 |
| 9,545,674 B2* | 1/2017 | Beardmore | ........... | B23B 49/023 |

* cited by examiner

TWIST LOCK TOOL SYSTEM

FIELD

The aspects of the disclosed embodiment relate to boring tools and in particular coupling of a boring tool to a fixture.

BACKGROUND

Generally manufactured parts may need holes or apertures bored therein. One example of such a manufactured part is a spar, such as for an aircraft. A fixture is used to hold the part in place while holes are bored in the part. In the case of aircrafts, the fixtures holding the parts may be large and include one or more platforms with openings therethrough. A liner bushing may be placed in each hole to guide a boring tool such as a drill with a motor. Generally the drill, including the motor, is coupled to the platform using a number of bolts that are inserted through a housing adapter of the motor. Each of the holes in the housing adapter is longitudinally arranged relative to the housing adapter and includes a large portion and a narrower portion so that the housing adapter can be rotated to position the bolts in the narrower portion of the respective hole. Once in the narrower portion of the hole, the bolts are tightened down using a suitable tool. The positioning of the tool, such as the drill and its motor, may not be ergonomic and may require multiple operators to couple the tool to the platform. For example, to install a conventional boring tool, at least two operators are needed to index and couple the tool to the fixture (e.g. one operators hold the tool in place while the at least another operator inserts and tightens the bolts to couple the tool to the fixture). In some instances, depending on the size of the part being manufactured, there may a large number of locations that require boring which can lead to long fixture setup and breakdown times.

It would be advantageous to have a tool to fixture coupling that allows a single operator to quickly and ergonomically couple the tool to the fixture.

SUMMARY

Accordingly, apparatus and method, intended to address the above-identified concerns, would find utility.

In accordance with one or more aspects of the present disclosure a tool system includes a liner having a body and a plurality of coupling members extending from the body, the body includes a first aperture through which at least part of a tool extends and is configured for coupling to a tool fixture. The tool system further includes a housing having an second aperture through which the at least part of the tool extends, a first end of the housing having unthreaded ramped grooves configured to mate with the plurality of coupling members to couple the tool within the grooves and to the tool fixture.

In accordance with one or more aspects of the present disclosure a coupling system includes a liner configured for coupling to a boring fixture, a housing having a first end configured to couple to a boring tool and a second end configured to couple to the liner, and twist lock elements disposed on the liner and the second end of the housing. The twist lock elements effecting a coupling between the liner and the housing for coupling the boring tool to the boring fixture, wherein the twist lock elements disposed on the liner are configured to allow axial insertion of the twist lock elements disposed on the second end of the housing into a respective twist lock element disposed on the liner and configured to couple the housing to the liner with a relative rotation between the housing and the liner.

In accordance with one or more aspects of the present disclosure a method for coupling a boring tool to a boring fixture includes coupling the boring tool to a first end of a housing, coupling a liner to the boring fixture; and coupling the boring tool to the boring fixture through an engagement of mating twist lock elements of the liner and housing.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

FIGS. 3A-3D are schematic illustrations of a portion of a boring system in accordance with aspects of the disclosed embodiment;

FIGS. 4A-4E are schematic illustrations of a portion of a boring fixture in accordance with aspects of the disclosed embodiment;

In the block diagram(s) referred to above, solid lines connecting various elements and/or components may represent mechanical, electrical, fluid, optical, magnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

Figure 1:
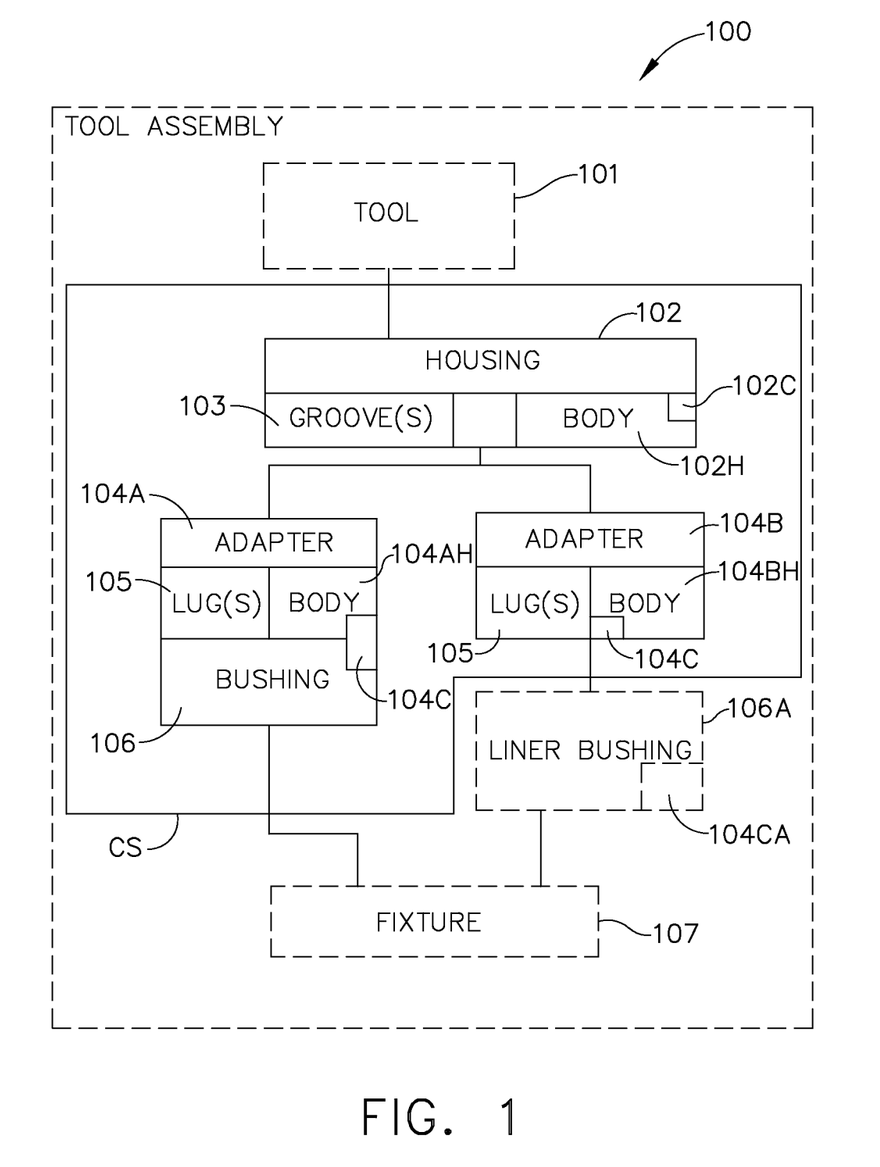
FIG. 1 is a schematic block diagram of a tool assembly including aspects of the disclosed embodiment.

Referring to FIG. 1, a schematic block diagram of a tool system 100 is illustrated. In one aspect, the tool system 100 includes a boring system having a tool housing 102 and a housing adapter (also referred to herein as a liner) 104A, 104B. In one aspect any suitable tool 101 may be coupled in any suitable manner to the housing 102. The housing adapter 104A, 104B may be coupled to a fixture 107 in any suitable manner. As will be described in greater detail below the housing adapter 104A, 104B and the housing 102 form a coupling system CS that allows for the coupling of the housing 102 (and the tool 101 coupled thereto) to the fixture 107. The boring system described herein allows for the coupling of the tool 101 to the fixture 107 in a more ergonomic manner than conventional coupling systems, as will be described below, as the boring system utilizes a twist lock fastening system that does not utilize screws to couple the housing 102 to the adapter 104A, 104B. The boring system described herein also provides reduced tool system 100 setup and breakdown time as the boring system is self-indexing (as will be described below) and, as noted above, does not use screws to couple the housing 102 to the adapter 104A, 104B.

Figure 2A:
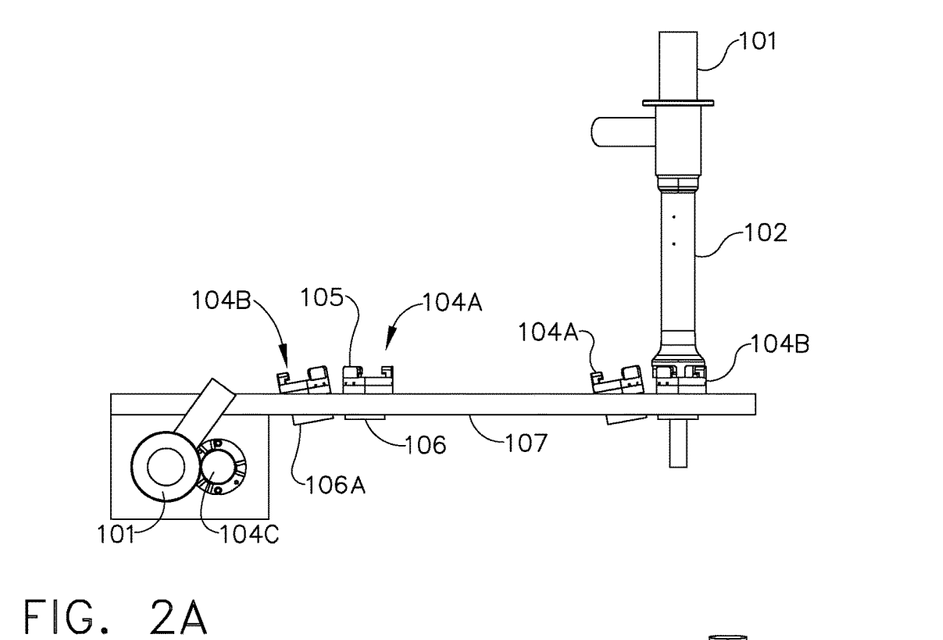
FIGS. 2A and 2B are schematic illustrations of a boring fixture including aspects of the disclosed embodiment.
Figure 2B:
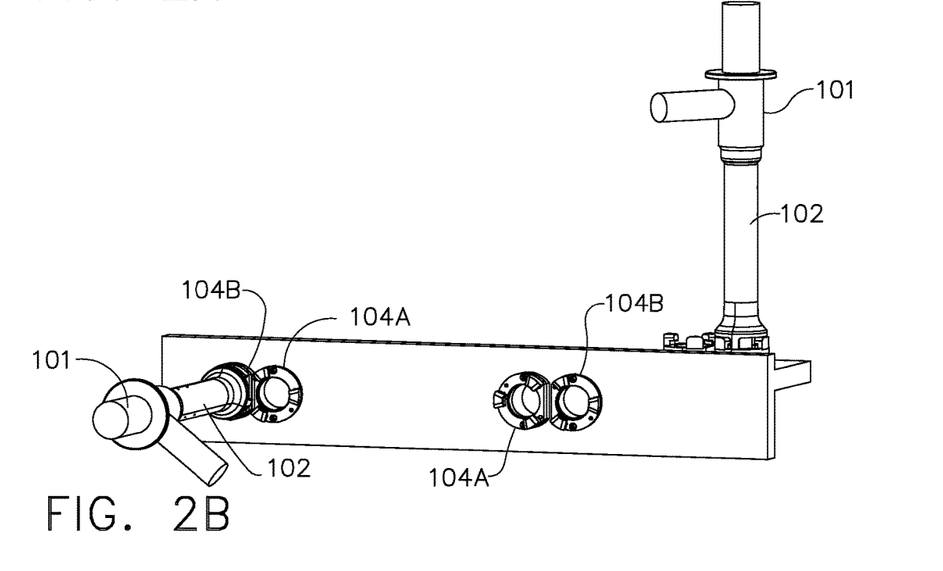

Referring also to FIG. 2 the tool system 100 may include a fixture 107 to which one or more boring tools 101 are coupled. The fixture 107 may include one or more apertures into which a liner bushing 106A is inserted and coupled (in any suitable manner, such as with fasteners or a press/interference fit) for guiding the tool 101 during a boring operation. The apertures may be arranged in the fixture 107 so that the one or more boring tools 101 are arranged at any suitable angle relative to each other and the part being manufactured. In one aspect an adapter or liner 104B may be coupled to the liner bushing 106A in any suitable manner such as with any suitable number of bolts or other suitable fastener(s) or with a press/interference fit. In another aspect, the adapter or liner 104A may include an integral bushing 106 as will be described below, where the integral bushing 106 is inserted into the aperture of the fixture 107 in lieu of the liner bushing 106A. The adapter 104A may be coupled to the fixture in any suitable manner such as with any suitable number of bolts or other suitable fastener(s) 310 (FIG. 3C) or with a press/interference fit. As may be realized, any suitable locating pins or other features 311 (FIG. 3C) may be provided to orient or index the adapter 104A, 104B to the fixture 107. In other aspects the adapter 104A, 104B may not be indexed to the fixture 107. The tool 101 may be coupled to the housing 102 in any suitable manner so that at least a portion of the tool extends through a longitudinally arranged aperture 102C (relative to a common longitudinal centerline or axis CL) in a body 102H of the housing 102. The housing 102 and the adapter 104A, 104B may include twist lock features, as will be described below, that allow for the coupling of the housing 102 (and tool 101 coupled thereto) to the adapter 104A, 104B such that the housing 102 and adapter 104A, 104B are arranged along the common longitudinal centerline CL. The twist lock features may index the tool 101 to the fixture 107 and securely hold and support the tool on the fixture.

Figure 3A:
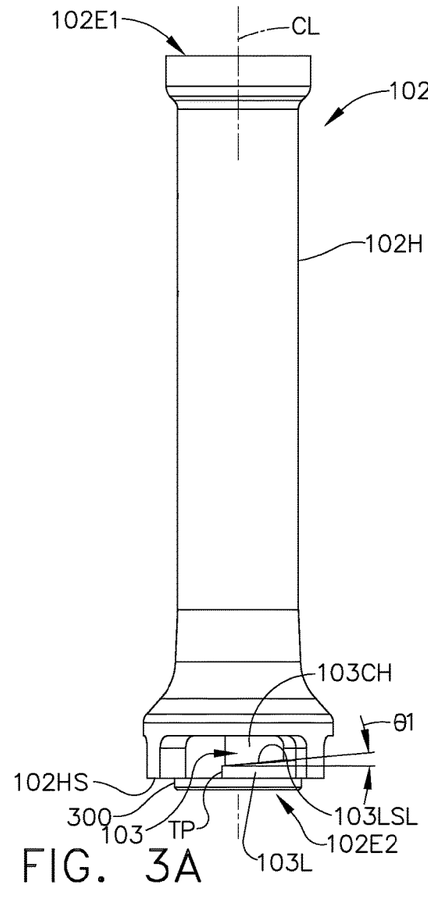
Figure 3B:
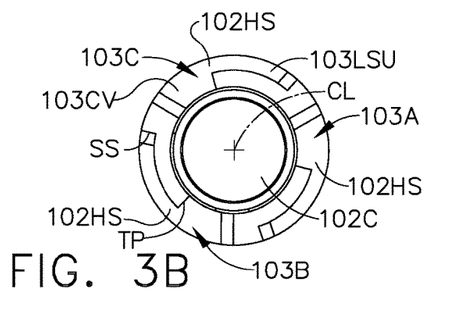
Figure 3C:
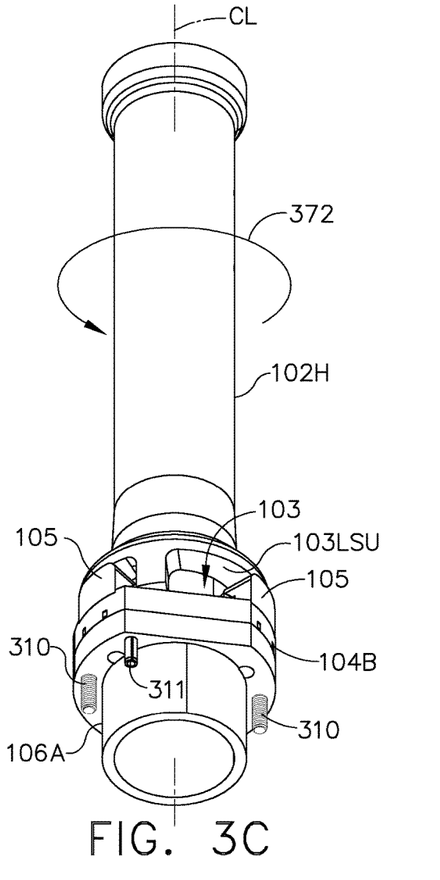

Referring to FIGS. 3A-3C the housing 102 may be constructed of any suitable material, such as aluminum, steel, composite, alloy, etc., and include a longitudinally extended body 102H through which an aperture or channel 102C is provided. The body 102H includes a first end 120E1 to which the tool 101 is coupled in any suitable manner so that at least a portion of the tool 101 (such as a boring bar, drill bit, linear motor, drive shaft, etc.) extends through the aperture 102C. The body 102H includes a second end 102E2, opposite the first end 102E1, that is configured for coupling to the adapter 104A, 104B. For example, the second end 102E2 may include any suitable number of unthreaded ramped grooves 130A-103C (generally referred to herein as groove(s) 103) having a longitudinal groove portion 103CV and a circumferential groove portion 103CH.

The longitudinal groove portion 103CV may allow for the insertion of a lug 105 of the adapter 104A, 104B (described below) to be inserted into the groove 103 for securing the housing 102 to the adapter 104A, 104B. It is noted that while three grooves 103A-103C are illustrated in FIGS. 3A-3C in other aspects any suitable number of grooves 103, such as more or less than three, may be provided. In one aspect the circumferential portion 103CH of each groove 103 may form a channel defined by a first surface 103LSU of the body 120H and a second surface 103LSL disposed on an opposite side of the channel 103CH than the first surface 103LSU. The second surface 103LSL may be a tapered or otherwise angled surface (e.g. ramped or inclined relative to a mating/longitudinal axis CL of the twist lock coupling described herein and/or inclined relative to a seating surface 102HS described below) formed in a radially extending platform 103L having a tip portion TP adjacent to and partially forming the longitudinal groove portion 103CV.

The radially extending platform 103L may be configured such that the second surface 130LSL is a ramped surface that inclines in a circumferential direction away from the tip portion TP. Opposite the ramped surface the radially extending platform 103L may include an adapter seating/interface surface 102HS. In one aspect the body 102H may also include an extension portion 300 that is inserted into, for example, a channel 104C of the adapter 104A, 104B for, at least partially, aligning the housing 102 to the adapter 104A, 104B. In other aspects, the extension portion may be excluded such that alignment of the housing 102 and adapter 104A, 104B is provided by the twist lock features described herein.

Referring now to FIGS. 4A-4E the adapter 104B is schematically illustrated. In this aspect the adapter 104B is configured for coupling (as described above) to the liner bushing 106A (FIG. 4E) such that a longitudinal axis of an aperture or channel 104CA of the liner bushing 106A is substantially coaxial with a longitudinal axis CL of an aperture 104C of the adapter 104B. For example, a body 104BH of the adapter 104B may include one or more fastener apertures 401A, 401B through which fasteners 310 are inserted for coupling the adapter 104B to the fixture 107 (FIG. 1) and/or one or more apertures 460 through which locating pins may be inserted for indexing the adapter 104B to the fixture 107. In one aspect one or more of the fastener apertures 401A, 401B and the one or more apertures 460 may be disposed radially inward from the grooves relative to a longitudinal axis of the aperture 104C. The body 104BH may also include any other suitable alignment or clearance features (e.g. such as flat 104BHF or other cut out) that may interface with or provide clearance between the adapter 104B and fixture 107.

The body 104BH of the adapter 104B may include aperture 104C that extends longitudinally through the body 104BH. The body 104BH may have a first surface 104BHS configured to interface with and support the housing 102. The body 104BH may also have a second surface 104BHB configured to interface with, for example, the liner bushing 106A. In one aspect the body 104BH may include an extension or alignment member 415 that is configured for insertion into the liner bushing 106A for aligning the aperture 104C of the adapter 104B and an aperture 104CA of the liner bushing 106A along the centerline CL.

One or more lugs or coupling members 105A-105C may extend longitudinally away from the surface 104BHS to engage the grooves 103 of the housing 102. It is noted that while three lugs 105A-105C are illustrated for exemplary purposes only, any suitable number of lugs (e.g. corresponding to the number of grooves 103) may be provided. In one aspect the lugs 105A-105C may be removable from the body 104BH such that the body 104BH includes a predetermined mounting position 400A-400C for each lug 105A-105C. In one aspect the mounting positions 400A-400C may be recessed surfaces that are recessed below the first surface 104BHS. One or more apertures 430A having a recessed fastener head portion 430 and an alignment portion 402 may be provided at each mounting position 400A-400C. In this aspect the fastener may be inserted through the body 104BH from surface 104BHB for threading into the lugs 105A-105C but in other aspects the lugs 105A-105C may be configured such that the fastener is inserted through an aperture (similar to aperture 130A) in the lug 105A-105C for threading into the body 104BH. Each aperture 402 may be configured, along with a corresponding fastener, to align a respective lug in a predetermined orientation relative to the centerline CL for engagement with a corresponding groove 103. In this aspect the lugs 105A-105C are configured to decouple from (e.g. are removable from) the body 104BH as illustrated in FIGS. 4A-4E, in other aspects the lugs 105A-105C may be integrally formed with the body 104BH as a monolithic member (as illustrated in FIGS. 5A and 5B).

In one aspect each lug 105A-105C may include a standoff or stanchion portion 410 that includes a mounting surface 410S that engages a respective mounting position 400A-400C and includes apertures 402A that are configured to align and couple the lugs 105A-105C to the body 104BH. Each lug 105A-105C may also include a groove interface portion 411 that extends radially inward (towards centerline CL). The groove interface portion 411 may include an interface surface 105S that is configured to engage the surface 103LSL of the housing 102. The interface surface 105S may be spaced a predetermined distance from the surface 104BHS so as to form a passage or channel 420 into which the radially extending platform 103L (FIGS. 3A-3C) is inserted. The interface surface 105S may be a ramped surface having a ramp angle θ2 (see FIG. 5B) corresponding to an angle θ1 of the surface 103LSL of the radially extending platform 103L.

Figure 5A:
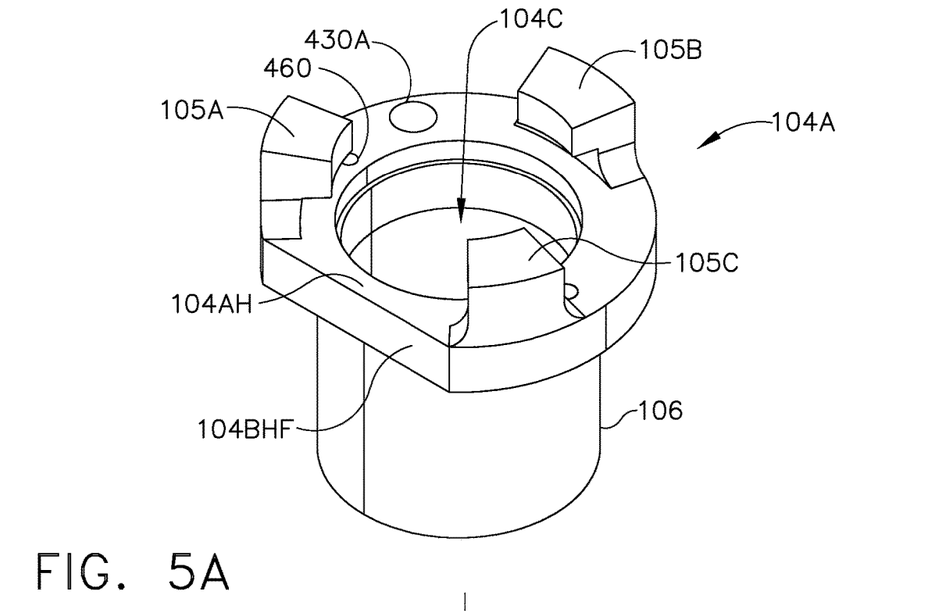
FIGS. 5A and 5B are schematic illustrations of a portion of a boring fixture in accordance with aspects of the disclosed embodiment.
Figure 5B:
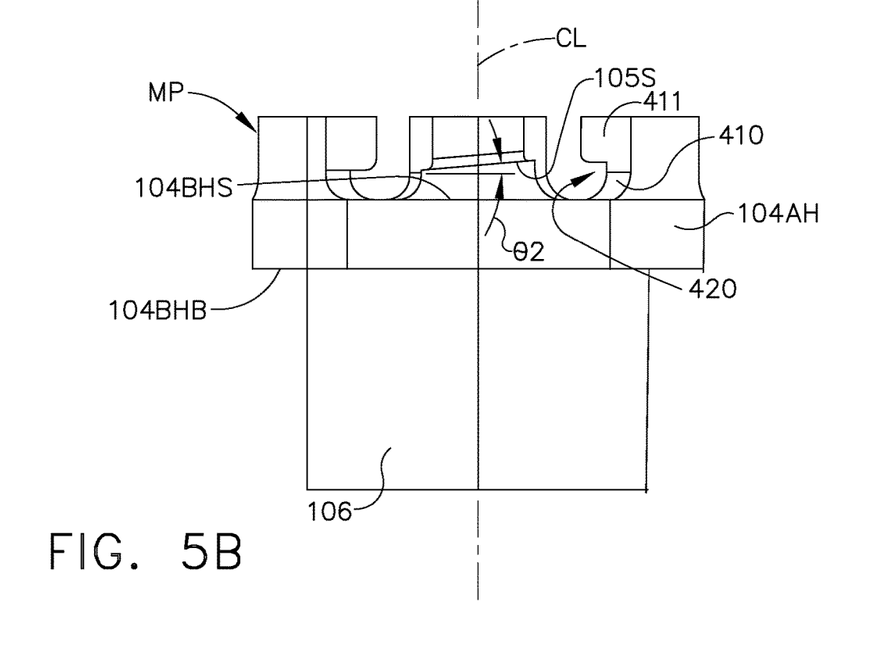

Referring now to FIGS. 5A and 5B, in another aspect of the disclosed embodiment the adapter 104A and liner bushing may be integrally formed as a monolithic member. For example, the adapter 104A may be substantially similar to adapter 104B described above however, in this aspect the body 104AH may include a bushing portion 106 and a mounting portion MP (e.g. where the mounting portion MP is formed by the lugs 105A-105C and at least a portion of the body such as the first and second surfaces 104BHS and 104BHB) where a single uninterrupted aperture 104C extends through the body 104AH (including the bushing portion 106. The mounting portion MP may facilitate the coupling of the housing 102 to the adapter 104B and/or the coupling of the adapter 104B to the fixture 107. In this aspect the lugs 105A-105C are also integrally formed with the body 104AH as a monolithic member but in other aspects the lugs 105A-105C may configured such that each individual lug 105A-105C may be removed in a manner substantially similar to that described above with respect to adapter 104B. Here the adapter 104A may be press/interference fit into the fixture 107 for securing the adapter to the fixture 107 while in other aspects the adapter may include apertures 430A through which fasteners (in addition to or in lieu of the press/interference fit) may be inserted for securing the adapter 104A to the fixture 107.

Figure 6A:
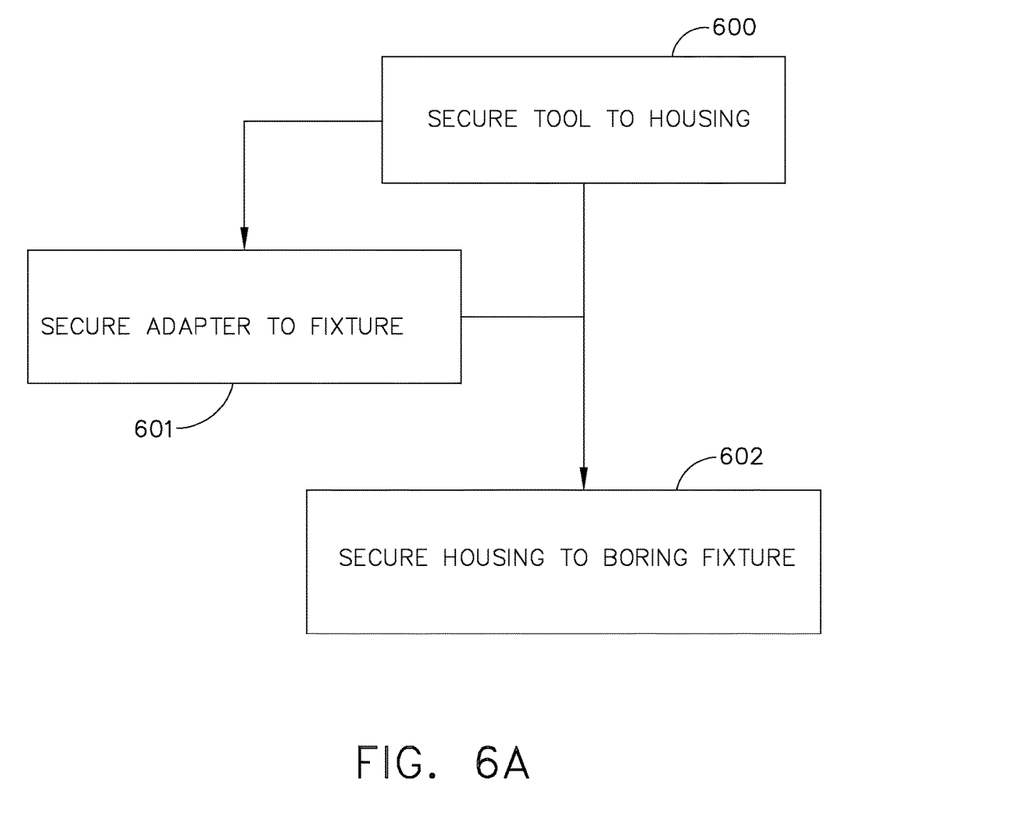
FIG. 6A is a block diagram of an boring tool installation method in accordance with aspects of the disclosed embodiment.

In accordance with the aspects of the disclosed embodiment, referring to FIGS. 1, 3A-3C and 6A, a method for coupling a boring tool to a boring fixture is provided. The boring tool 101 may be coupled to the first end 102E1 of the housing 102 (FIG. 6A, block 600). The adapter 104A, 104B may be coupled to the fixture 107 as described herein (FIG. 6A, Block 601). As may be realized, once the adapter 104A, 104B is coupled to the fixture the adapter 104A, 104B may remain coupled to the fixture unless maintenance of the adapter is required and as such after the initial installation of the adapter 104A, 104B there is no added set up or break down time attributed to the adapter 104A, 104B. The boring tool 101 that is coupled to the housing 102 may be coupled to the boring fixture 107, along with the housing 102 (e.g. the boring tool 101 and the housing 102 form a unitary assembly), through an engagement of mating twist lock elements of the adapter 104A, 104B (e.g. lugs 105A-105C) and housing 102 (e.g. grooves 103) (FIG. 6, Block 602) where the adapter 104A, 104B and the housing 102 form a twist lock coupling. As described herein, the grooves 103 may be configured to allow axial insertion of the lugs 105A-105C into a respective groove 103 and coupling of the housing 102 with the adapter 104A, 104B with less than a full (e.g. 360°) rotation. For example, the relative rotation between the housing 102 and the adapter 104A, 104B may be about 90°, about 180° or any other suitable rotation angle that is less than 360°. As may be realized, after the initial installation of the adapter 104A, 104B the housing 102 may be coupled to the boring fixture 107 without the step of coupling the adapter 104A, 104B to the boring fixture 107.

Referring also to FIGS. 4A-4E, (coupling of the housing 102 to both adapter 104A and adapter 104B may occur in a substantially similar manner) engagement of the mating twist lock features will be described. The housing 102 may be placed over the adapter 104A, 104B so that the lugs 105A-105C are aligned with the longitudinal groove portion 103CV of the respective grooves 103A-103C (e.g. the twist lock features provide a self-indexing coupling through engagement of the grooves 103 and lugs 105A-105C). The housing 102 may be moved relative to the adapter 104A, 104B so that the lugs 105A-105C pass into the longitudinal groove portion 103CV and are inserted into the respective groove 103A-103C (e.g. the grooves are configured to allow axial/longitudinal insertion of the lugs into a respective groove). It is noted that in the Figs. (see FIG. 3C) the grooves 103 are illustrated as extending radially outward such that the stanchion portion 410 of each lug 105A-105C is disposed radially outward of the grooves 103 and the groove interface portion 411 extends radially inward (e.g. towards centerline CL) to engage the groove 103. In other aspects the grooves 103 may extend radially inward such that the stanchion portion 410 of each the lug 105A-105C is disposed radially inward of the grooves 103 and the groove interface portion 411 extends radially outward (e.g. away from centerline CL) to engage the groove 103.

Relative movement between the housing 102 and the adapter 104A, 104B may continue until the first surface 104BHS of the adapter 104A, 104B substantially contacts the adapter interface surface 102HS of the housing so that the housing 102 is longitudinally supported by the first surface 104BHS. The housing 102 may be rotated in, for example, the direction of arrow 372 about the centerline CL so that as the housing 102 rotates the ramped second surface 103LSL of the radially extending platform 103L engages the correspondingly ramped interface surface 105S of a respective lug 105A-105C (e.g. as the housing 102 is rotated engagement of the surfaces 102HS, 104BHS causes tension forces in the lugs 105A-105C and compression forces in the radially extending platform 103L for coupling the housing 102 to the adapter 104A, 104B and thus the boring fixture 107). The second surface 103LSS and the interface surface 105S are configured such that as the housing 102 rotates about axis/centerline CL in the direction of arrow 372 the housing 102 is longitudinally displaced towards the adapter 104A, 104B to seat the surface 102HS against the surface 104BHS until a predetermined torque value is reached when rotating the housing 102.

Figure 3D:
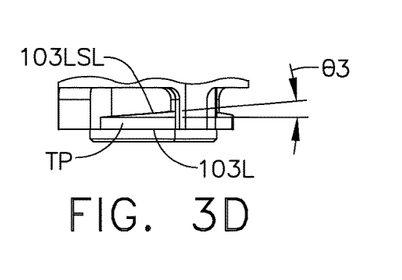
Figures 4A, 4B, 4D, 4E:
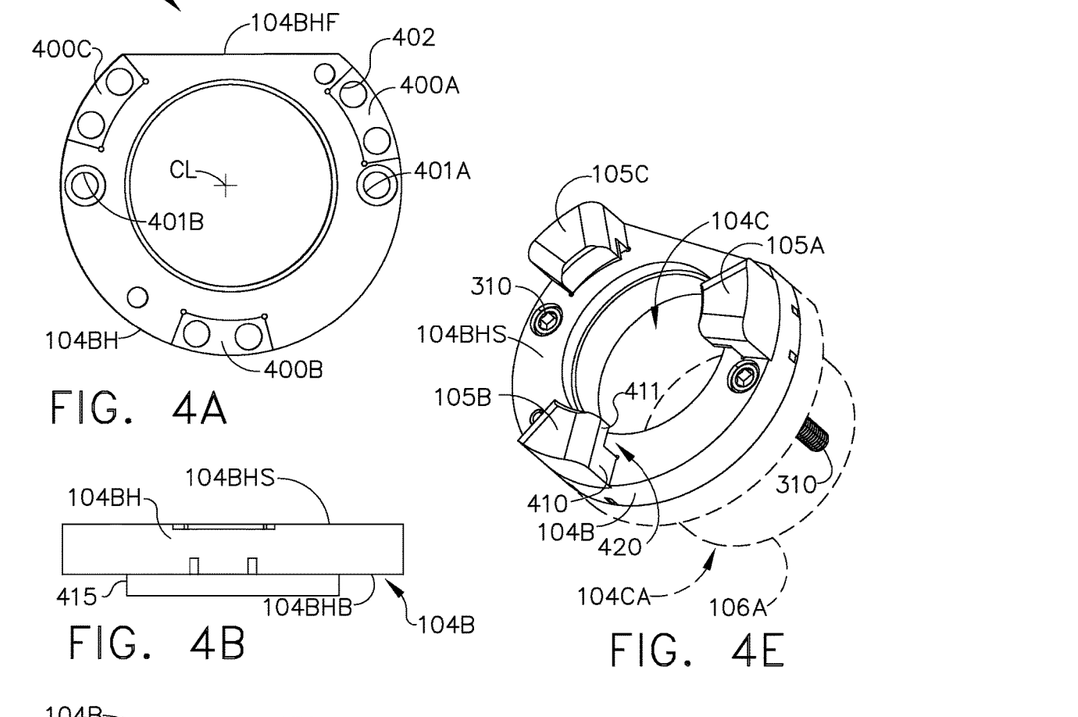
Figure 4C:
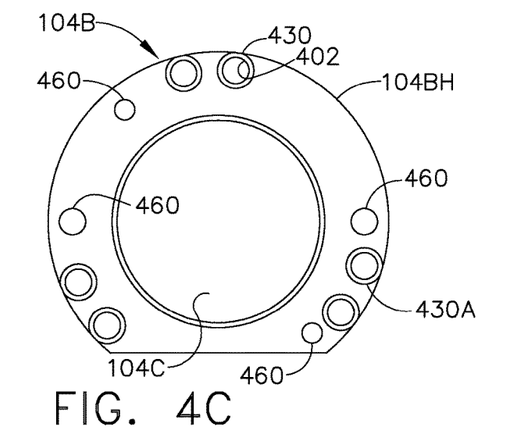
Figure 4D:
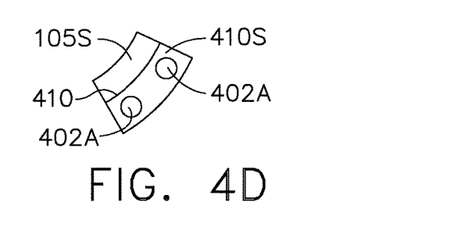

In other aspects the grooves 103 may include a stop surface SS (FIG. 3B) such that when the lug 105A-105C engages a respective stop surface SS the housing 102 and tool 101 coupled thereto is coupled to the boring fixture 107. In still other aspects, any suitable detent or other engagement features may be provided within the grooves 103 for engaging the lugs 105A-105C and indicating that the housing 102 and tool 101 coupled thereto is coupled to the boring fixture 107. In one aspect the grooves 103 and the lugs 105A-105C may be configured (e.g. through mating ramped surfaces) so that as the housing 102 is rotated the aperture 102C of the housing 102 and the aperture 104C (and 104CA) of the adapter 104A, 104B are substantially aligned along centerline CL. For example, the ramped surfaces 103LSL, 105S may be arranged at compound angles to provide alignment of the apertures 102C, 104C. For example, referring also to FIG. 3D, in addition to being angled in a circumferential direction by an amount θ1 the ramped surface 103LSL may also be angled in a radial direction by an amount θ3 so that the ramped surface LSL is angled in at least two different directions. It should be understood that while the compound angle formed by the angles θ1 and θ3 is illustrated with respect to the surface 103LSL, the ramped surface 105S may have a corresponding compound angle such that the component (e.g. angle θ3) of the compound angle in, for example, radial direction provides centering forces that effect the alignment of the apertures 102C, 104C during coupling of the housing 102 and the adapter 104A, 104B. In other aspects any suitable surfaces of the lugs 105A-105C and the grooves 103 may be configured to engage each other and provide alignment between the apertures 102C, 104C. As such, the housing 102 (and the tool coupled thereto) may be securely coupled to the adapter 104A, 104B with a single twisting or rotating movement that is less than a full turn (e.g. one 360° rotation) of the housing 102 relative to the adapter 104A, 104B.

Figure 6B:
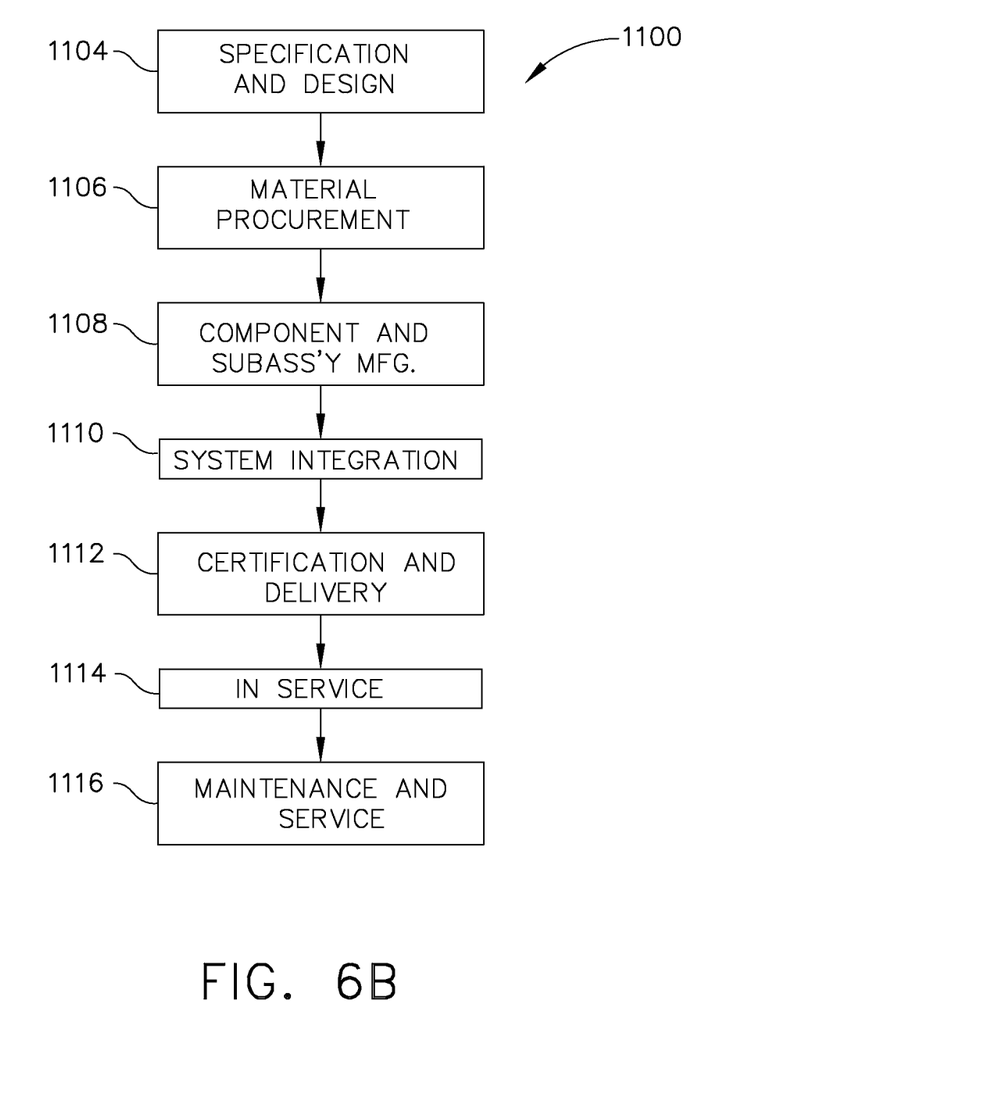
FIG. 6B is a block diagram of aircraft production and service methodology.
Figure 7:
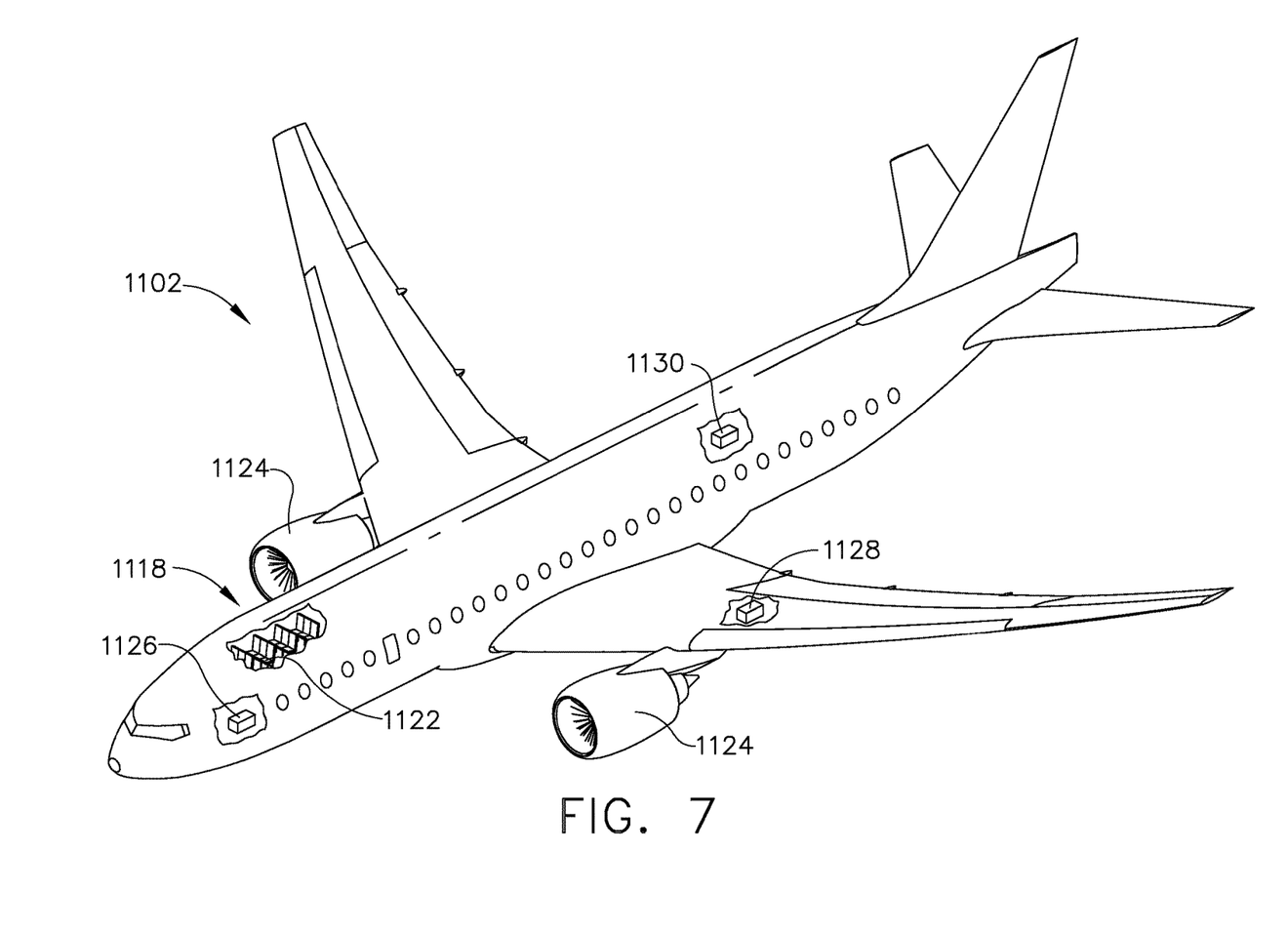
FIG. 7 is a schematic illustration of an aircraft.

Examples of the disclosure may be described in the context of an aircraft manufacturing and service method 1100 as shown in FIG. 6B and an aircraft 1102 as shown in FIG. 7. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, the aircraft 1102 produced by the illustrative method 1100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. The aspects of the disclosed embodiment described herein may be used in the production of, for exemplary purposes only, wing spars and fittings for any suitable aircraft however, it should be understood that the aspects of the disclosed embodiment may be used for the production of any suitable manufactured part in the aerospace, marine, automotive or other suitable industry where a boring tool is coupled to a boring fixture.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

The aspects of the present disclosure provide a self-indexing twist lock coupling for securing a boring tool 101 to a boring fixture 107. The aspects of the disclosed embodiment decrease the setup and break down time for coupling one or more boring tools 101 to the boring fixture 107. For exemplary purposes only, conventional coupling of the boring tool to the boring fixture using multiple operators for indexing/aligning and securing the boring tool may take about 5 minutes per boring tool. In accordance with the aspects of the disclosed embodiment, a single operator may index/align and couple the boring tool to the boring fixture in about 2 minutes per boring tool (about a 60% reduction in setup and break down time). The aspects of the disclosed embodiment also provide for increased ergonomic handling and coupling of the boring tool to the boring fixture when compared to conventional installation procedures.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

In accordance with one or more aspects of the disclosed embodiment a tool system includes a liner having a body and a plurality of coupling members extending from the body, the body includes a first aperture through which at least part of a tool extends and is configured for connection to a tool fixture; and a housing having an second aperture through which the at least part of the tool extends, a first end of the housing having unthreaded ramped grooves configured to mate with the plurality of coupling members to couple the tool within the grooves and to the tool fixture.

In accordance with one or more aspects of the disclosed embodiment the body is configured for coupling to a fixture bushing.

In accordance with one or more aspects of the disclosed embodiment the body is a monolithic body including a mounting portion and a bushing portion, where the plurality of coupling members extend from a side of the mounting portion.

In accordance with one or more aspects of the disclosed embodiment the housing includes a second end opposite the first end, the second end being configured for coupling to the tool.

In accordance with one or more aspects of the disclosed embodiment the plurality of coupling members and the grooves engage each other so as to form a twist lock coupling for securing the housing, and the tool coupled thereto, to the tool fixture where the grooves are configured to allow axial insertion of the plurality of coupling members into a respective groove and coupling of the housing to the liner with less than a full rotation of the housing relative to the liner.

In accordance with one or more aspects of the disclosed embodiment the tool fixture is a boring fixture and the tool is a boring tool.

In accordance with one or more aspects of the disclosed embodiment the plurality of coupling members are configured to decouple from the body.

In accordance with one or more aspects of the disclosed embodiment the liner includes fastener apertures extending longitudinally therethrough.

In accordance with one or more aspects of the disclosed embodiment the fastener apertures are disposed radially inward from the grooves relative to a longitudinal axis of the first and second apertures.

In accordance with one or more aspects of the disclosed embodiment the plurality of coupling members and the grooves are configured such that coupling of the plurality of coupling members with the grooves effects alignment of first and second apertures along a common longitudinal axis.

In accordance with one or more aspects of the disclosed embodiment a coupling system includes a liner configured for coupling to a boring fixture; a housing having a first end configured to couple to a boring tool and a second end configured to couple to the liner; and twist lock elements disposed on the liner and the second end of the housing, the twist lock elements effecting a coupling between the liner and the housing for securing the boring tool to the boring fixture; wherein the twist lock elements disposed on the liner are configured to allow axial insertion of the twist lock elements disposed on the second end of the housing into a respective twist lock element disposed on the liner and configured to couple the housing to the liner with a relative rotation between the housing and the liner.

In accordance with one or more aspects of the disclosed embodiment the twist lock elements include a plurality of coupling members disposed on the liner and corresponding ramped grooves disposed on the housing.

In accordance with one or more aspects of the disclosed embodiment the plurality of coupling members are configured to decouple from the liner.

In accordance with one or more aspects of the disclosed embodiment the liner is a monolithic liner including a mounting portion and a bushing portion, where the plurality of coupling members extend from a side of the mounting portion.

In accordance with one or more aspects of the disclosed embodiment the liner includes fastener apertures extending longitudinally therethrough.

In accordance with one or more aspects of the disclosed embodiment the housing and liner have an aperture extending therethrough, the aperture being configured to allow passage of at least a portion of the boring tool, and the fastener apertures are disposed radially inward from the ramped grooves relative to a longitudinal axis of the aperture.

In accordance with one or more aspects of the disclosed embodiment the liner includes a body configured for coupling to a fixture bushing.

In accordance with one or more aspects of the disclosed embodiment a method for coupling a boring tool to a boring fixture includes coupling the boring tool to a first end of a housing; coupling a liner to the boring fixture; and coupling the boring tool to the boring fixture through an engagement of mating twist lock elements of the liner and housing.

In accordance with one or more aspects of the disclosed embodiment engagement of the mating twist lock elements includes engaging a plurality of coupling members disposed on the liner with corresponding unthreaded ramped grooves disposed on a second end of the housing, where the second end is opposite the first end.

In accordance with one or more aspects of the disclosed embodiment engagement of the mating twist lock features effects alignment of the boring tool with the boring fixture and allows for boring through a part held by the boring fixture.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the present disclosure. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A tool system comprising:
a liner having a body and a plurality of coupling members extending from the body, the body includes a first aperture through which at least part of a tool extends and is configured for coupling to a tool fixture; and
a housing having an second aperture through which the at least part of the tool extends, a first end of the housing having unthreaded ramped grooves configured to mate with the plurality of coupling members to couple the tool within the unthreaded ramped grooves and to the tool fixture, the plurality of coupling members having an arcuate shape with compound engagement surfaces that corresponds to a mating arcuate shape, having mating compound engagement surfaces, of the unthreaded ramped grooves so that engagement between the compound engagement surfaces of the plurality of coupling members and the mating compound engagement surfaces of the unthreaded ramped grooves aligns the first aperture with the second aperture along a common longitudinal axis, where the compound engagement surfaces and the mating compound engagement surfaces are angled in both a circumferential direction and a radial direction relative to the common longitudinal axis.

2. The tool system of claim 1, wherein the body is configured for coupling to a fixture bushing.

3. The tool system of claim 1, wherein the body is a monolithic body including a mounting portion and a bushing portion, where the plurality of coupling members extend from a side of the mounting portion.

4. The tool system of claim 1, wherein the housing includes a second end opposite the first end, the second end being configured for coupling to the tool.

5. The tool system of claim 1, wherein the plurality of coupling members and the grooves engage each other so as to form a twist lock coupling for securing the housing, and the tool coupled thereto, to the tool fixture where the grooves are configured to allow axial insertion of the plurality of coupling members into a respective groove and coupling of the housing to the liner with less than a full rotation of the housing relative to the liner.

6. The tool system of claim 1, wherein the tool fixture is a boring fixture and the tool is a boring tool.

7. The tool system of claim 1, wherein the plurality of coupling members are configured to decouple from the body.

8. The tool system of claim 1, wherein the liner includes fastener apertures extending longitudinally therethrough.

9. The tool system of claim 8, wherein the fastener apertures are disposed radially inward from the unthreaded ramped grooves relative to a longitudinal axis of the first and second apertures.

10. The tool system of claim 1, wherein the plurality of coupling members and the unthreaded ramped grooves are configured such that coupling of the plurality of coupling members with the unthreaded ramped grooves effects alignment of the tool with the tool fixture and allows for boring through a part held by the tool fixture.

11. A coupling system comprising:
a liner configured for coupling to a boring fixture and including a first tool passage aperture;
a housing having a first end configured to couple to a boring tool, a second end configured to couple to the liner, and a second tool passage aperture; and
twist lock elements disposed on the liner and the second end of the housing, the twist lock elements each having mating compound engagement surfaces effecting a coupling between the liner and the housing for coupling the boring tool to the boring fixture;
wherein the twist lock elements disposed on the liner are configured to allow axial insertion of the twist lock elements disposed on the second end of the housing into a respective twist lock element disposed on the liner and configured to couple the housing to the liner with a relative rotation between the housing and the liner so that engagement between the mating compound engagement surfaces of the twist lock elements disposed on the liner and the mating compound engagement surfaces of the twist lock elements disposed on the second end of the housing aligns the first tool passage aperture with the second tool passage aperture along a common longitudinal axis, where the compound engagement surfaces and the mating compound engagement surfaces are angled in both a circumferential direction and a radial direction relative to the common longitudinal axis.

12. The coupling system of claim 11, wherein the twist lock elements include a plurality of coupling members disposed on the liner and corresponding ramped grooves disposed on the housing.

13. The coupling system of claim 12, wherein the plurality of coupling members are configured to decouple from the liner.

14. The coupling system of claim 12, wherein the liner is a monolithic liner including a mounting portion and a bushing portion, where the plurality of coupling members extend from a side of the mounting portion.

15. The coupling system of claim 12, wherein the liner includes fastener apertures extending longitudinally therethrough.

16. The coupling system of claim 15, wherein
the housing and liner have an aperture extending therethrough, the aperture being configured to allow passage of at least a portion of the boring tool, and
the fastener apertures are disposed radially inward from the ramped grooves relative to a longitudinal axis of the aperture.

17. The coupling system of claim 11, wherein the liner includes a body configured for coupling to a fixture bushing.

18. A method for coupling a boring tool to a boring fixture, the method comprising:
coupling the boring tool to a second end of a housing;
coupling a liner to the boring fixture, where the liner has a body and a plurality of coupling members extending from the body; and
coupling the boring tool to the boring fixture through an engagement of mating twist lock elements of the liner and housing, where the housing has a first end with unthreaded ramped grooves that mate with the plurality of coupling members to couple the tool within the unthreaded ramped grooves and to the boring fixture where, the plurality of coupling members have an arcuate shape with compound engagement surfaces that corresponds to a mating arcuate shape, having mating compound engagement surfaces, of the unthreaded ramped grooves so that engagement between the compound engagement surfaces of the plurality of coupling members and the mating compound engagement surfaces of the unthreaded ramped grooves aligns a first tool passage aperture of the housing with a second tool passage aperture of the liner along a common longitudinal axis, where the compound engagement surfaces and the mating compound engagement surfaces are angled in both a circumferential direction and a radial direction relative to the common longitudinal axis.

19. The method of claim 18, wherein engagement of the mating twist lock elements includes engaging the plurality of coupling members disposed on the liner with corresponding unthreaded ramped grooves disposed on the first end of the housing, where the second end is opposite the first end.

20. The method of claim 18, wherein engagement of the mating twist lock features effects alignment of the boring tool with the boring fixture and allows for boring through a part held by the boring fixture.

* * * * *